Figure 1:
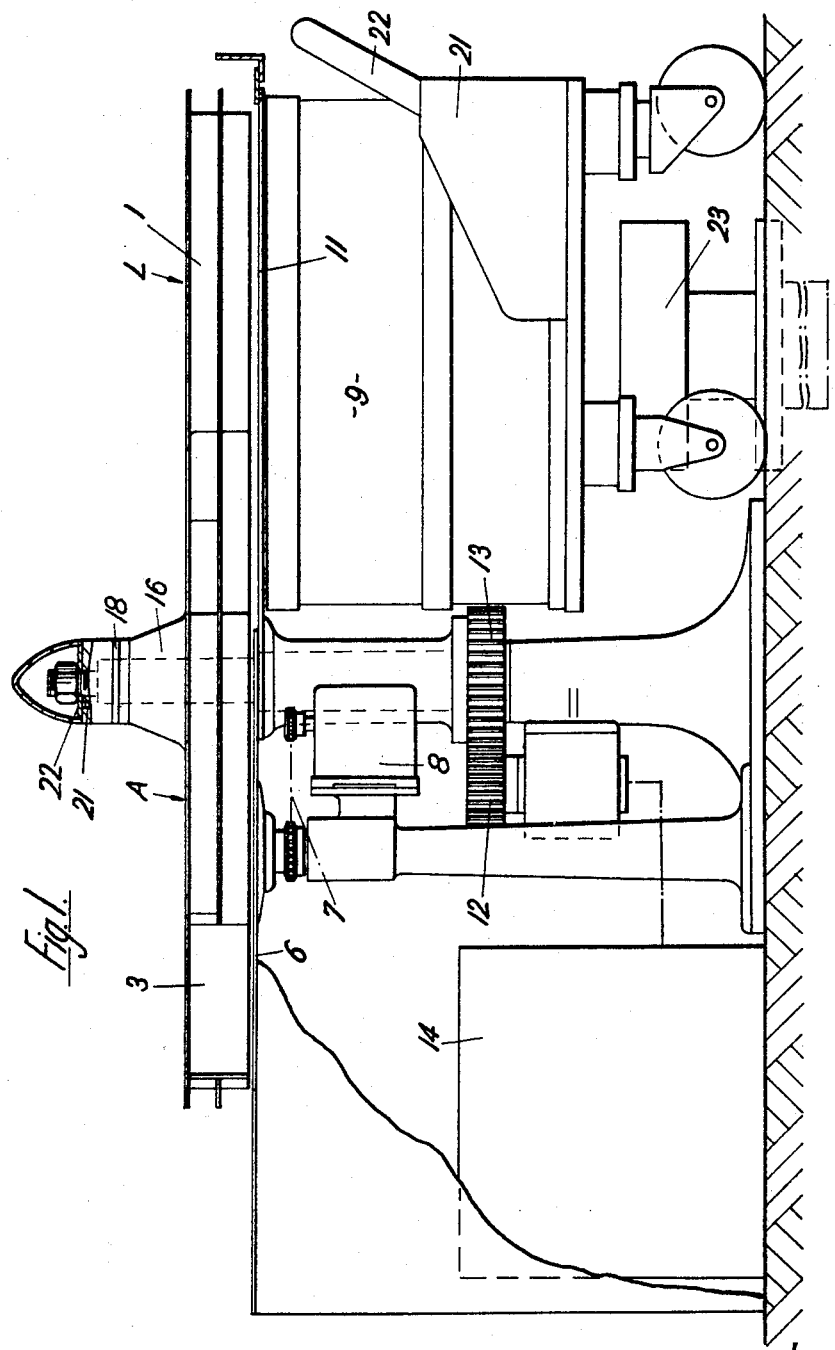

July 16, 1968  G. H. RAINBOW ETAL  3,392,892
CAN HANDLING

Filed June 7, 1966  4 Sheets-Sheet 1

Inventors
George H. Rainbow, Peter Scott
and Arnold M. Throp
By
Mason Porter, Diller & Brown
Attorneys July 16, 1968    G. H. RAINBOW ETAL    3,392,892

CAN HANDLING

Filed June 7, 1966    4 Sheets-Sheet 4

Inventors
George H. Rainbow, Peter Scott
and Arnold M. Throp.
By
Mason, Porter, Diller & Brown
Attorneys United States Patent Office 3,392,892
Patented July 16, 1968

3,392,892
CAN HANDLING
George Henry Rainbow, Gerrards Cross, Peter Scott, London, and Arnold Martin Throp, Pinner, England, assignors to The Metal Box Company Limited, London, England, a British company
Filed June 7, 1966, Ser. No. 555,828
Claims priority, application Great Britain, June 18, 1965, 25,945/65
9 Claims. (Cl. 214—6)

This invention relates to can handling when preparing the cans for processing in a retort.

Cans are usually disposed in crates or baskets for insertion into a retort for processing, the crate being made of metal and the cans arranged in the crate in superimposed layers separated by perforated separator plates. The crate has a loose base plate and during filling of the crate the base plate is raised, by any suitable means, to a position near the top of the crate at which the first layer of cans can be positioned or formed on the base plate. The base plate is then lowered and a separator plate is positioned on the top of the said layer to receive the next layer of cans. This procedure is repeated until the base plate is again positioned at the bottom of the crate and the crate is loaded with cans and is ready for insertion into the retort.

It is a main object of the present invention to provide apparatus for loading cans into a retort crate of the kind having a loose base plate and which avoids the use of separator plates.

According to the invention there is provided apparatus for loading cans into a retort crate of the kind having a loose base plate and in which a jacking device located at a loading position is operable to raise and lower the loose base plate of a crate located at the loading position to permit successive layers of cans to be superimposed on each other on the base plate, wherein can-receiving pockets are supported for movement in a horizontal plane between an assembly position at which a layer of cans is assembled in a pocket and the loading position at which the layer is delivered into a crate, and an alternating shutter is operable to support a layer of cans in a pocket during movement thereof into loading relation with the crate at the loading position and to release the layer when the pocket is located in loading position relative to the crate thereby to permit the layer to be deposited, as appropriate, on to the base plate or on to a layer already deposited on the base plate.

In one embodiment of the invention an intermediate position is provided between the assembly and loading positions, a stationary plate extends between the assembly and intermediate positions to support cans while the pocket is located at the intermediate position and during movement of the pocket between the assembly and intermediate positions, and the shutter alternates between the intermediate and loading positions and is disposed beneath the stationary plate when located at the intermediate position. With this embodiment three equi-spaced can-receiving pockets may be carried by an intermittently rotatable support therefor, whereby the pockets when stationary are located one at each of said positions, the shutter being an oscillatory shutter. Oscillation of the shutter may be effected by driving mechanism coupled therewith and the support be coupled with the shutter for rotation thereby during movement thereof towards the loading position. The coupling between the shutter and support may include a toothed member rotatable with the support and a spring-loaded drive pawl movable with the shutter.

Each pocket may be formed by a vertical wall including a gate operable to admit cans to the pocket while the pocket is located at the assembly position and to retain cans in the pocket during movement thereof between the assembly and loading positions. The apparatus may include a table on to which cans are delivered through said gate, said table being supported for rotation in a direction such as to effect movement of cans through the gate and into the pocket, and driving means operable to effect rotation of the table.

Figure 2:
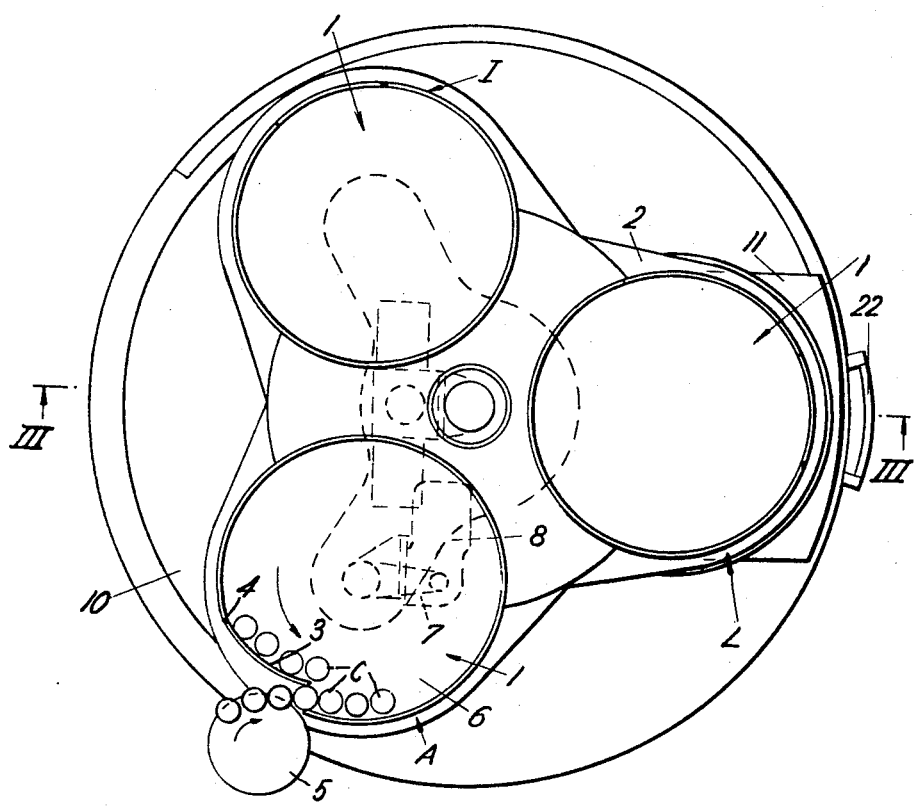
Figure 3:
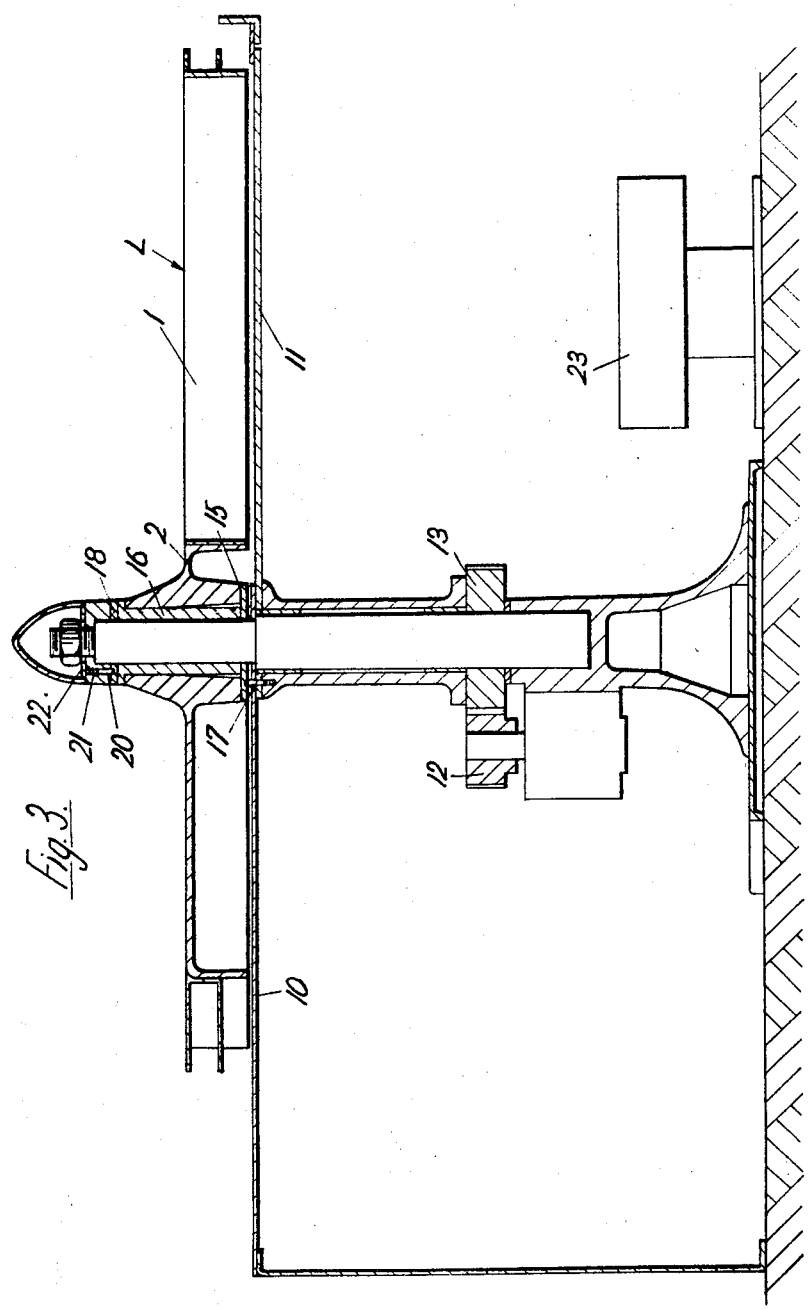
Figure 4:
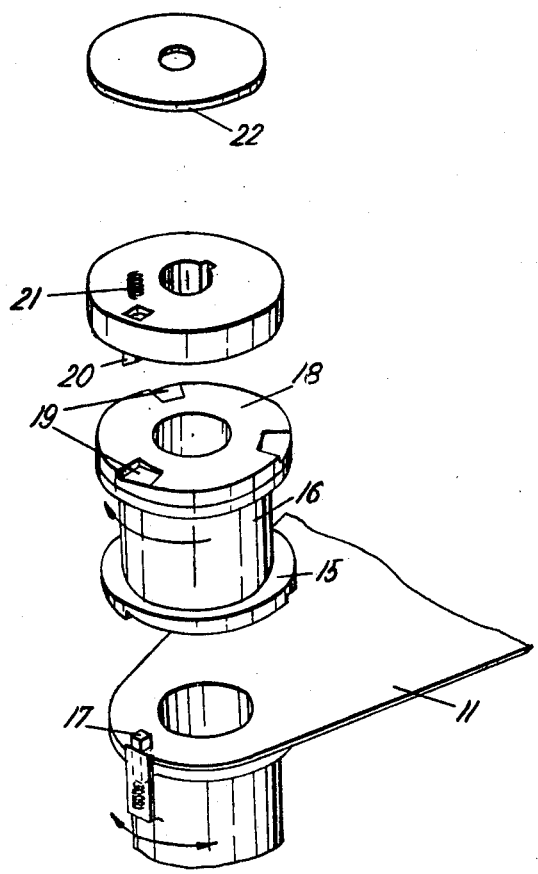

In order that the invention may be clearly understood one embodiment thereof will now be described, by way of example, with reference to the accompanying drawings, in which:

FIG. 1 is an elevation of apparatus according to the invention,
FIG. 2 is a top plan of FIG. 1,
FIG. 3 is a section on line III—III, FIG. 2, and
FIG. 4 is an exploded view illustrating the means by which a pocket support is rotated by a shutter embodied in the apparatus.

Referring to the drawings, three can-receiving pockets 1, FIG. 2, each formed by a vertical well, are supported by an intermittently rotatable support 2 for movement in a horizontal plane between an assembly position A and a loading position L. The three pockets 1 are equispaced and between the assembly position A and the loading position L is an intermediate position I, the arrangement being such that when the pockets 1 are stationary one pocket is located at each of the positions or stations A, I and L.

The vertical wall of each pocket 1 is provided with a gate 3 pivoted at 4 and arranged to be moved to the open condition thereof, as shown in FIG. 2, by engagement with a fixed stop, not shown, as the pocket approaches the assembly position A. Cans C are delivered one at a time to a pocket at the assembly position by a feed disc 5 and pass on to a table 6 supported for rotation beneath the pocket. The table 6 is rotated by a chain 7 driven by an electric motor 8, FIG. 1, and is rotated in the direction shown in FIG. 2 so as to move the cans C through the gate and into the pocket to form therein a layer of cans to be deposited in a retort crate 9, FIG. 1. A stationary plate 10, FIGS. 2 and 3, extends between the assembly position A and the intermediate position I and as the pocket, with a layer of cans therein, is moved from the assembly position A to the intermediate position I the pocket moves the cans off the table 6 on to the stationary plate 10. As the pocket moves away from the assembly position A the gate is closed by the cans in the pocket and so retains the cans in the pocket. At the intermediate position I the cans are still supported in the pocket by the stationary plate 10 but beneath the plate 10 is a shutter 11, FIGS. 2 and 3, which is oscillatable between the intermediate position I and the loading position L, the shutter is shown at the loading position L in FIGS. 2 and 3. As the pocket moves from the intermediate position I towards the loading position L the cans are moved off the plate 10 on to the shutter 11 which supports the cans until they are in position at the loading position L for loading into the crate 9 when the shutter 11 returns to the intermediate position I so releasing the cans which are thus deposited as a layer into the crate 9.

Oscillation of the shutter 11 is effected by driving mechanism which is coupled therewith and the support 2 is coupled with the shutter 11 for rotation thereby during movement thereof towards the loading position L. The driving mechanism for shutter 11 may be of any desired kind but as shown in the drawings, consists of gears 12, 13, FIG. 1, driven by a hydraulic power pack 14. The coupling between the shutter 11 and support 2 is illustrated in FIG. 4 and consists of a toothed member 15 rotatable with the boss 16 which carries the support 2 (not shown in FIG. 4) and a spring-loaded drive pawl 17 movable with the shutter 11. The boss 16 is provided also with a locking plate 18 having locking recesses 19 in which a spring loaded locking pawl 20 is engaged to lock the support in the stationary positions hereof. The locking pawl 20 is loaded by a spring 21 retained in position by a keeper 22. As the shutter 11 moves from the intermediate position I towards the loading position L the pawl 17 engages a tooth of member 15 and effects rotation of the support 2. On the return movement of the shutter 11 the pawl 17 ratchets freely over the member 15 until it is spring-urged to engage the next tooth on member 15.

The crate 9 is of the known kind which has a loose base plate, not shown, and is wheeled, in known manner, on a truck 21, FIG. 1, having a handle 22, into the loading position where it is located above a jacking device illustrated as the plunger 23 of a hydraulic ram. The plunger 23 and crate 9 are aligned with a pocket 1 located at the loading position L and at the start of a loading operation the plunger 23 is raised so as to lift the loose base plate of the crate to a position at which a layer of cans is deposited thereon. The plunger 23 is then lowered to a position at which the next layer of cans can be deposited on the layer already resting on the base plate and this procedure is repeated until the base plate is restored to its position at the bottom of the crate when the crate will be filled with layers the lowest one of which rests on the base plate and the others are superimposed one on the other.

As shown in the drawings the crate 9 is assumed to be of circular cross-section but the cross-section may, if desired, be other than circular.

While it is preferred that three positions A, I and L be provided as described above it is possible to use only the two stations A and L and to move the shutter therebetween, omitting the stationary plate 10. Further, if desired, the pockets may be moved in a path other than a circular path as described with reference to the drawings, in which event the shutter may be caused to alternate in any suitable manner, for example it may be caused to reciprocate.

We claim:

1. Apparatus for loading cans into a retort crate of the kind having a loose base plate, and in which a jacking device located at a loading position is operable to raise and lower the loose base plate of a crate located at the loading position to permit successive layers of cans to be superimposed on each other on the base plate, wherein can-receiving pockets are supported for movement in a horizontal plane between an assembly position at which a layer of cans is assembled on a table under a pocket and the loading position at which the layer is delivered into a crate, and an alternating shutter is operable to support a layer of cans in a pocket during movement thereof into loading relation with the crate at the loading position and to release the layer by sliding the shutter from under the pocket when the pocket is located in loading position relative to the crate thereby to permit the layer to be deposited, as appropriate, on to the base plate or on to a layer already deposited on the base plate.

2. Apparatus according to claim 1, wherein an intermediate position is provided between the assembly and loading positions, a stationary plate extends between the assembly and intermediate positions to support cans while the pocket is located at the intermediate position and during movement of the pocket between the assembly and intermediate positions, and the shutter alternates between the intermediate and loading positions and is disposed beneath the stationary plate when located at the intermediate position.

3. Apparatus according to claim 2, wherein three equispaced can-receiving pockets are carried by an intermittently rotatable support therefor, whereby the pockets when stationary are located one at each of said positions, and wherein the shutter is an oscillating shutter.

4. Apparatus according to claim 3, wherein oscillation of the shutter is effected by driving mechanism coupled therewith and the support is coupled with the shutter for rotation thereby during movement thereof towards the loading position.

5. Apparatus according to claim 4, wherein the coupling between the shutter and support includes a toothed member rotatable with the support and a spring-loaded drive pawl movable with the shutter.

6. Apparatus according to claim 3, wherein each pocket is formed by a vertical wall including a gate operable to admit cans to the pocket while the pocket is located at the assembly position and to retain cans in the pocket during movement thereof between the assembly and loading positions.

7. Apparatus according to claim 6, wherein cans are delivered through said gate to said table, said table being supported for rotation in a direction such as to effect movement of cans through the gate and into the pocket, and driving means operable to effect rotation of the table.

8. Apparatus according to claim 4, wherein each pocket is formed by a vertical wall including a gate operable to admit cans to the pocket while the pocket is located at the assembly position and to retain cans in the pocket during movement thereof between the assembly and loading positions.

9. Apparatus according to claim 5, wherein each pocket is formed by a vertical wall including a gate operable to admit cans to the pocket while the pocket is located at the assembly position and to retain cans in the pocket during movement thereof between the assembly and loading positions.

References Cited

UNITED STATES PATENTS

| 2,506,661 | 5/1950 | Busse | 53—163 X |
| 2,768,756 | 10/1956 | Horman. | |
| 3,324,623 | 6/1967 | Johnson et al. | 53—163 |

ROBERT G. SHERIDAN, *Primary Examiner.*

R. J. SPAR, *Assistant Examiner.*